3,160,563
PURIFICATION OF HEPARIN
Toccaceli Nazzareno, Milan, Italy, assignor to
Ormonoterapia Richter S.p.A., Milan, Italy
No Drawing. Filed July 15, 1960, Ser. No. 42,970
Claims priority, application Italy, May 13, 1960,
8,569/60
5 Claims. (Cl. 167—74)

This invention relates to the purification of raw products containing heparin (solutions or powders) obtained from small gut, lungs or liver of oxen or pigs. The methods heretofore used for this purpose are based principally on fractionated precipitations with alcohol or acetone, with cadmium, lead, barium salts, etc.

It has now been taken into consideration that there is a method which uses as precipitating agent a quaternary ammonium salt of general formula

in which $R_1$, $R_2$ and $R_3$ represent lower aliphatic residues (methyl, ethyl, propyl and homologues), $R_4$ is a higher aliphatic residue, preferably containing 12-20 carbon atoms, and X is a halogen-ion.

Suitable for this purpose are, also, quaternary salts derived from pyridine and its homologues (picoline, collidine, etc.) of the general formula

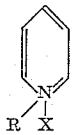

where R represents a higher aliphatic residue (preferably containing 12-20 carbon atoms) and X is a halogen-ion.

It is long known that some organic compounds of the base type (protamine, benzidine, brucine etc.) combine with heparin to form more or less insoluble compounds, depending upon the organic base used and upon the conditions of the medium (pH, ionic strength etc.). For example the compound "heparin-protamine" is practically insoluble in water in a wide range of pH and ionic strengths, whereas other analogous compounds are more sensitive to changes of pH as well as of ionic strength.

Besides heparin, other analogous substances of an acid character are able to form compounds which are slightly soluble in water when they combine with an organic base of the aforesaid type, but these compounds are generally more dissociated than the heparin compound. By adequately controlling the ionic strength of the medium, these compounds can be, therefore, easily separated from the heparin compound, which is generally less soluble. This method of purification is based on this very principle.

Among the many salts of quaternary organic bases commercially obtainable which are suitable for the purpose of this invention, the cetyltrimethylammonium bromide (CeTAB) gives the best results. With this compound, the heparin forms a compound which is insoluble at a relatively high ionic strength (0.8–1.0); but other analogous salts can be used for the same purpose.

The insoluble compound which forms with heparin flocculates only after a long time, never quantitatively, and it is therefore necessary to filter it with filtering earth (celite, perlite, "Hyflo Super-Cel, etc.) which, inter alia, has the capacity of adsorbing the insoluble compound which is formed. Among the many filtering earths the best results are given by celite, but also other types give satisfactory results.

The elution is carried out by means of various salts, inter alia sodium and potassium acetate, and calcium, potassium, sodium, etc. chlorides in various concentrations. The use of calcium chloride is limited by the fact that the $Ca^{++}$ ion which is present in the final product interferes in biological titration. Among the tested salts, potassium chloride and sodium chloride proved to be the most suitable. The concentration of sodium chloride which is suitable for the elution of the compound "heparin-organic base" from the filtering earth is properly maintained at a higher than 10% weight/volume; lower concentrations elute too slowly and not quantitatively, whereas higher concentrations (from 15 to 25% weight/volume) elute rapidly and quantitatively; the best concentration is about 20% weight/volume.

The reprecipitation of the insoluble compound "heparin-organic base" is performed by diluting the sodium chloride solution with distilled water to a concentration of NaCl of 4.0–5.5% weight/volume; higher concentrations do not allow a quantitative precipitation of the heparin compound, whereas lower concentrations cause the precipitation of inactive compounds. A concentration of NaCl 5% can suitably be employed; but at this concentration the reprecipitation of the compound "heparin-organic base" is quantitative only if it is carried out in the presence of a slight excess of precipitating compound.

As regards the use of potassium chloride as an eluting agent, satisfactory results are obtained by eluting with a 30% weight/volume solution of KCl and by reprecipitating at a concentration of 7% weight/volume. The solution of KCl may range from about 20% to 35% weight/volume.

The various purifying operations are hereinafter reported in brief.

The starting raw product is suspended in water and brought to pH 7.5–8 0 with 1 M sodium or potassium hydroxide; in order to achieve a complete solubilization of the heparin which is present in the raw product, it is necessary to raise the temperature to 75–80 C. The given pH range (7.5–8.0) is not critical for the purpose of this invention, but particularly suitable for the filtrations, and is employed for this very reason.

After the solubilization, the mixture is filtered and the filtrate is treated with acetone until a concentration of 50–60% is reached; after some hours the precipitate is separated by centrifuging or by filtration, washed with a little methanol and redissolved in water. The solution obtained is ready to be treated with the precipitating reagent, without the necessity of dialyzing it.

The addition of the precipitating reagent is best carried out slowly, stirring well. The precipitate so formed is filtered on filtering earth and eluted with a 20% weight/volume solution of NaCl or 30% weight/volume of KCl; the eluate is diluted with distilled water to an NaCl content of 5%, or KCl content of 7% and the precipitate is filtered again on filtering earth; it is again eluted with NaCl or KCl, reprecipitated by dilution, filtered, and this time the filtrate is diluted with only one volume of distilled water; the organic base is eliminated by precipitation with sulfocyanides, alkaline iodides, cyanides etc.; after filtration the pure heparin is precipitated by means of acetone or ethyl alcohol (with 1 volume or 2 volumes respectively). If raw products of very low percentage are to be treated, the cycle elution-reprecipitation by dilution-filtration can be repeated 3–4 times instead of 2 times.

The advantages of the method of this invention can be recapitulated as follows:

(1) High recovery of the anticoagulating activity,
(2) High purity of the final product (110–125 u./mg.),
(3) Short processing,
(4) Minimum consumption of organic solvents,
(5) Employability with any raw product also of a very low percentage.

The following examples illustrate in more detail the method of this invention; but they do not limit the invention in any way.

EXAMPLE 1

*Raw Product From Small Intestine-Oxen Gut*

20 g. of raw heparin (1.8 u./mg.) were suspended in 400 ml. of water; the pH was brought to 7.5–8.0 with 1 N solution of NaOH and the temperature was raised to 80° C., while stirring. To the suspension was added filtering earth, filtered under vacuum, then the filter was washed with a little warm water.

The whole solution was treated with acetone until a concentration of 60% was reached and after some hours, the precipitate was collected by centrifuging, washed with a little methyl alcohol and redissolved in 200 ml. of water. To this solution was added an excess of 5% solution of CeTAB dissolved in water at 40° C.

After 60 minutes of stirring the mixture was filtered under vacuum on filtering earth. The precipitate was eluted with a 20% solution of NaCl, then filtered under vacuum. The eluate was diluted with distilled water to a concentration of 5% NaCl; in order to obtain a quantitative precipitation of the complex "heparin-organic base," it was added, while stirring, to a slight excess of 5% CeTAB and the pH corrected to 7.0–8.0, if necessary. After about 2 hours it was filtered on filtering earth, rejecting the clear filtrate.

The precipitate was eluted from the filtering earth with 20% solution of NaCl and the eluate diluted with distilled water to a concentration of NaCl of 5%, while adding again a slight excess of CeTAB. After a further 2 hours it was filtered on filtering earth, and the clear filtrate was rejected.

The following elution was carried out with small volumes of 20% NaCl; the eluate was diluted with the same volume of water and the CeTAB was eliminated by precipitating and filtering. The clear solution so obtained was precipitated with the same volume of acetone.

The product was collected by centrifuging, washed with acetone and dried in vacuo. Activity of the final product: 120 u./mg. Yield: 13,000 u./kg. of small intestine-oxen gut.

EXAMPLE 2

*Raw Product From Oxen Lungs*

30 g. of raw heparin (3.2 u./mg.) were dissolved in 600 ml. of water at pH 7.5–8.0; the opalescent solution was filtered under vacuum on filtering earth. The residue was washed on the filter with small amounts of hot water and the whole filtrate was treated with acetone to a concentration of 60%. After some hours, the precipitate was collected by centrifuging, washed with methyl alcohol and dissolved in 300 ml. of water.

To this solution was added a slight excess of 5% aqueous solution of CeTAB at 40° C. After 60 minutes of stirring the solution was filtered on filtering earth and the precipitate was eluted with a 20% solution of NaCl, carrying out the filtration under vacuum.

The eluate was diluted with distilled water to a concentration of NaCl 5% and the pH was brought to 7.5. In order to achieve a quantitative precipitation of the heparin complex, a slight excess of 5% CeTAB was added, while stirring. The suspension was allowed to stand for two hours and filtered through a filtering earth and yielded a clear filtrate. The precipitate was again eluted from the filtering earth with a 20% solution of NaCl and the eluate diluted with distilled water to a concentration of NaCl 5%, again adding a slight excess of CeTAB and correcting the pH.

After standing for an additional 2 hours, the solution was filtered through filtering earth, yielding a clear filtrate.

The eluate was diluted with an equal volume of water and the CeTAB eliminated by precipitation and filtration. The elution was carried out with small amounts of 20% sodium chloride.

The clear solution so obtained was precipitated with 1 volume of acetone; the precipitate was collected and dried as described in Example 1. Activity of the final product: 25 u./mg. Yield: 14,000 u./kg. of fresh lung.

EXAMPLE 3

*Raw Product From Oxen Liver*

10 g. of raw heparin (34 u./mg.) were dissolved in 200 ml. of water at pH 7.5 at 50–60° C., then the solution was filtered on filtering earth. The residue was washed on the filter with small amounts of water at 50–60° C.

To the whole filtrate was added an excess of a 5% aqueous solution of CeTAB at 40° C. and the precipitate was filtered on filtering earth after 30 minutes of standing.

The precipitate was eluted from the filtering earth with a 20% solution of NaCl and the eluate diluted with distilled water to a concentration of NaCl 5%.

After the addition of a slight excess of CeTAB the mixture was left standing for 2 hours at room temperature; the precipitate was filtered on filtering earth and eluted with a 20% solution of NaCl.

The eluate was diluted with the same volume of distilled water and the CeTAB eliminated by precipitating and filtering. The filtered solution was precipitated with 2 volumes of ethyl alcohol; the precipitate was dried as described in the preceding examples.

Activity of the final product: 110 u./mg. Yield: 10,000 u./kg. of fresh liver.

Because of the relative purity of the starting product, it was necessary to make only one purification cycle obtaining, nevertheless, a sufficiently high activity of the final product.

This method is suitable also for the purification of the heparin starting from raw or purified extracts, obtained from the above indicated organs.

PURIFICATION DIAGRAM

*Raw Product*

[Solubilization at pH 7.5–8.0. Precipitation with alcohol or acetone]

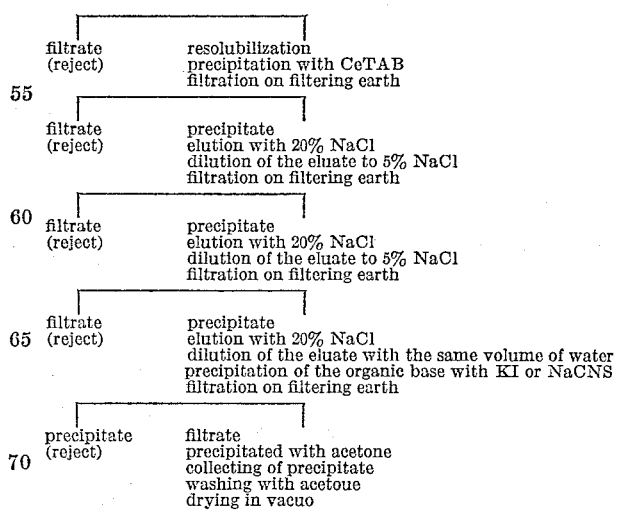

I claim:

1. A method for the purification of crude heparin which comprises providing an aqueous solution of crude heparin, adding thereto an agent taken from the class consisting of—

and

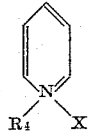

wherein $R_1$, $R_2$ and $R_3$ represent methyl, $R_4$ is cetyl, and X is halogen, whereby a mixture of a complex and some impurities are precipitated, said method being carried out in the absence of an organic solvent for said complex, filtering said complex onto filter earth capable of adsorbing said complexes, treating said earth with a salt of a metal taken from the class consisting of alkali and alkali earth in sufficiently high aqueous concentration to elute said complex, then diluting said eluate with water to precipitate purified heparin complex only.

2. A method according to claim 1 in that said elution is conducted with about 15–25% of weight/volume solution of sodium chloride.

3. A method according to claim 1 in that said elution is conducted with about 20–35% weight/volume solution of potassium chloride.

4. A method according to claim 2 in that the precipitation of the purified heparin is obtained by diluting until the concentration of sodium chloride is about 4.0–5.5% weight/volume.

5. A method according to claim 3 in that the precipitation of the purified heparin is obtained by diluting until the concentration of potassium chloride is about 7% weight/volume.

References Cited in the file of this patent

UNITED STATES PATENTS

| | | |
|---|---|---|
| 2,989,438 | Nomine | June 20, 1961 |
| 3,058,884 | Mozen | Oct. 16, 1962 |

OTHER REFERENCES

Scott: Biochimica and Biophysica Acta, vol. 18, 1955, pp. 428 and 429.

Scott: Chem. and Ind., Feb. 12, 1955, pp. 168 and 169.